(12) United States Patent
Yang

(10) Patent No.: US 10,896,164 B2
(45) Date of Patent: Jan. 19, 2021

(54) SAMPLE SET PROCESSING METHOD AND APPARATUS, AND SAMPLE QUERYING METHOD AND APPARATUS

(71) Applicant: ALIBABA GROUP HOLDING LIMITED, George Town (KY)

(72) Inventor: Wen Yang, Zhejiang (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/878,482

(22) Filed: May 19, 2020

(65) Prior Publication Data

US 2020/0278953 A1 Sep. 3, 2020

Related U.S. Application Data

(63) Continuation of application No. PCT/CN2018/123855, filed on Dec. 26, 2018.

(30) Foreign Application Priority Data

Jan. 8, 2018 (CN) .......................... 2018 1 0014815

(51) Int. Cl.
*G06F 16/22* (2019.01)
*G06F 16/245* (2019.01)
(Continued)

(52) U.S. Cl.
CPC ........ *G06F 16/2237* (2019.01); *G06F 16/182* (2019.01); *G06F 16/245* (2019.01); *G06F 16/285* (2019.01)

(58) Field of Classification Search
CPC .. G06F 16/2237; G06F 16/182; G06F 16/245; G06F 16/285
(Continued)

(56) References Cited

U.S. PATENT DOCUMENTS 5,577,135 A * 11/1996 Grajski .............. G06K 9/00422
382/187
10,176,246 B2 * 1/2019 Dang .................. G06F 16/2228
(Continued)

FOREIGN PATENT DOCUMENTS

| CN | 102663100 A | 9/2012 |
|---|---|---|
| CN | 102831225 A | 12/2012 |

(Continued)

OTHER PUBLICATIONS

International Search Report and Written Opinion (With English translation), dated Mar. 20, 2019, for International Application No. PCT/CN2018/123855, 14 pages.
(Continued)

*Primary Examiner* — Hicham Skhoun
(74) *Attorney, Agent, or Firm* — Seed IP Law Group LLP

(57) ABSTRACT

Implementations of the present specification provide classification and indexing methods and devices, and methods and devices for querying similar samples. During classification, the samples in the sample set are clustered at two levels, and the clustering results are recorded in a first vector table and a second vector table. During indexing, indexes are established at two levels for each sample in the sample set, where the first level index points to a coarse cluster center to which the sample belongs, and the second level index points to a segment cluster center corresponding to a segment vector of the sample. During query of similar samples, searches are performed at two levels on the query samples. The first-level search is to determine a coarse cluster center that is closer to the query sample from the first vector table obtained through classification, and obtain comparison samples that belong to the coarse cluster center. The second-level search is to select a comparison sample whose distance meets a predetermined
(Continued)

criterion as a similar sample. As such, retrieval and query of samples are accelerated.

24 Claims, 8 Drawing Sheets

(51) Int. Cl.
    *G06F 16/28*     (2019.01)
    *G06F 16/182*    (2019.01)
(58) Field of Classification Search
    USPC .......................................................... 707/738
    See application file for complete search history.

(56) References Cited

U.S. PATENT DOCUMENTS

| | | | | |
|---|---|---|---|---|
| 2003/0014250 | A1* | 1/2003 | Beigi | ................... G10L 17/02 |
| | | | | 704/238 |
| 2009/0006377 | A1* | 1/2009 | Kobayashi | ............ G06F 16/355 |
| 2012/0259831 | A1* | 10/2012 | Wang | ................ G06F 16/9535 |
| | | | | 707/708 |
| 2013/0188869 | A1 | 7/2013 | Yoo et al. | |
| 2015/0052139 | A1* | 2/2015 | Cevahir | ................ G06F 16/285 |
| | | | | 707/737 |
| 2015/0220617 | A1* | 8/2015 | Luo | ....................... G06F 16/285 |
| | | | | 707/737 |
| 2016/0328654 | A1* | 11/2016 | Bauer | .................... G06N 5/048 |
| 2017/0091308 | A1* | 3/2017 | Tan | ........................ G06F 16/285 |
| 2017/0308613 | A1* | 10/2017 | Zhu | ...................... G06F 16/9535 |
| 2018/0101570 | A1* | 4/2018 | Kumar | ................. G06K 9/6223 |
| 2018/0137137 | A1* | 5/2018 | Jin | .......................... G06F 16/36 |
| 2019/0065833 | A1* | 2/2019 | Wang | ................. G06K 9/00288 |
| 2020/0082165 | A1* | 3/2020 | Wang | ................... G06K 9/6223 |

FOREIGN PATENT DOCUMENTS

| | | |
|---|---|---|
| CN | 103136337 A | 6/2013 |
| CN | 103699771 A | 4/2014 |
| CN | 107451200 A | 12/2017 |
| CN | 108241745 A | 7/2018 |
| JP | 57-153754 U | 9/1982 |

OTHER PUBLICATIONS

Berretti et al., "Using Indexing Structures for Resource Descriptors Extraction From Distributed Image Repositories," *Proceedings/ 2002 IEEE International Conference on Multimedia and Expo.* 2: 197-200, 2002.

Zhou et al., "Efficient Similarity Search by Summarization in Large Video Database," *Conferences in Research and Practice in Information Technology (CRPIT).* vol. 63: 161-167, 2007.

* cited by examiner

SAMPLE SET PROCESSING METHOD AND APPARATUS, AND SAMPLE QUERYING METHOD AND APPARATUS

BACKGROUND

Technical Field

One or more implementations of the present specification relate to the field of computer technologies.

Description of the Related Art

With the development of the Internet, more and more search and query work is carried out using the Internet. For example, people have gotten used to using various search engines to search for content of interest. In addition, objects searched and queried by people are also increasingly complex, for example, in addition to searching for text keywords, people tend to search for pictures, music, etc. As search and query objects become more complex, the search difficulty increases exponentially. First, complex objects usually need to be represented by high-dimensional vectors. Therefore, it is generally necessary to compare the distances or similarities between a plurality of high-dimensional vectors during the search. In addition, in the era of big data, the data on the network tends to grow explosively. When a large amount of data exists in the sample library to be retrieved, if a brute-force search is used, a high-dimensional vector operation is performed for each sample, and the calculation amount is very large, so that a query time is too long, and therefore it is difficult to meet a user requirement.

BRIEF SUMMARY

One or more implementations of the present specification describe a method and device for pre-clustering samples in a sample set at two levels and establishing indexes at two levels, so that similar samples are quickly queried through retrieval at the two levels.

According to a first aspect, a sample set classification method is provided, including: determining N clusters and corresponding N cluster centers by clustering feature vectors of a plurality of samples in a sample set, and recording, in a first vector table, cluster identifiers of the N clusters and N center vectors corresponding to the N cluster centers; dividing a feature vector of each of the plurality of samples into M segments based on dimensions of the feature vector to form a segment vector corresponding to each segment i; and determining k segment clusters corresponding to each segment i and corresponding k segment cluster centers by clustering segment vectors of the plurality of samples in each segment, respectively, and recording, in a second vector table, cluster identifiers of the k segment clusters corresponding to each segment i and a segment center vector corresponding to each segment cluster center.

According to a second aspect, a method for establishing an index table for a sample set is provided, including: obtaining a first vector table and a second vector table according to the first aspect; obtaining a feature vector V of a sample in the sample set; determining a center vector that is closest to the feature vector V among the N center vectors recorded in the first vector table, and using a cluster identifier corresponding to the closest center vector as first index data; dividing the feature vector V into M segments based on dimensions of the feature vector V to form a segment vector Vi corresponding to each segment i; determining a segment center vector closest to a corresponding segment vector Vi among k segment center vectors corresponding to each segment i that are recorded in the second vector table, and using a cluster identifier of a segment cluster corresponding to the determined segment center vector as second index data; and adding the first index data and the second index data, respectively, to a first index field and a second index field of an index table.

According to a third aspect, a method for querying similar samples is provided, including: obtaining a feature vector T of a query sample; obtaining a first vector table and a second vector table according to the first aspect; obtaining an index table according to the second aspect; determining, among the N center vectors recorded in the first vector table, a center vector whose distance from the feature vector T meets a first predetermined criterion, and using a cluster corresponding to the center vector as a selected cluster; determining a sample corresponding to the selected cluster as a comparison sample based on the first index field in the index table; determining a sample distance between each of the comparison samples and the query sample; and determining a comparison sample whose sample distance meets a second predetermined criterion as a similar sample of the query sample.

According to a fourth aspect, a sample set classification device is provided, including: a first clustering unit, configured to determine N clusters and corresponding N cluster centers by clustering feature vectors of a plurality of samples in a sample set, and record, in a first vector table, cluster identifiers of the N clusters and N center vectors corresponding to the N cluster centers; a segmentation unit, configured to divide a feature vector of each of the plurality of samples into M segments based on dimensions of the feature vector to form a segment vector corresponding to each segment i; and a second clustering unit, configured to determine k segment clusters corresponding to each segment i and corresponding k segment cluster centers by clustering segment vectors of the plurality of samples in each segment, respectively, and record, in a second vector table, cluster identifiers of the k segment clusters corresponding to each segment i and a segment center vector corresponding to each segment cluster center.

According to a fifth aspect, a device for establishing an index table for a sample set is provided, including: a vector table acquisition unit, configured to obtain the first vector table and the second vector table that are obtained by the device according to the fourth aspect; a sample acquisition unit, configured to obtain a feature vector V of a sample in the sample set; a first index establishment unit, configured to determine a center vector that is closest to the feature vector V among the N center vectors recorded in the first vector table, and use a cluster identifier corresponding to the closest center vector as first index data; a segmentation unit, configured to divide the feature vector V into M segments based on dimensions of the feature vector V to form a segment vector Vi corresponding to each segment i; a second index establishment unit, configured to determine a segment center vector closest to a corresponding segment vector Vi among k segment center vectors corresponding to each segment i that are recorded in the second vector table, and use a cluster identifier of a segment cluster corresponding to the determined segment center vector as second index data; and a recording unit, configured to add the first index data and the second index data, respectively, to a first index field and a second index field of an index table.

According to a sixth aspect, a device for querying similar samples is provided, including: a query sample acquisition unit, configured to obtain a feature vector T of a query sample; a vector table acquisition unit, configured to obtain the first vector table and the second vector table that are obtained by the device according to the fourth aspect; an index table acquisition unit, configured to obtain an index table according to the fifth aspect; a first determining unit, configured to determine, among the N center vectors recorded in the first vector table, a center vector whose distance from the feature vector T meets a first predetermined criterion, and use a cluster corresponding to the center vector as a selected cluster; a second determining unit, configured to determine a sample corresponding to the selected cluster as a comparison sample based on the first index field in the index table; a distance determining unit, configured to determine a sample distance between each of the comparison samples and the query sample; and a sample determining unit, configured to determine a comparison sample whose sample distance meets a second predetermined criterion as a similar sample of the query sample.

According to a seventh aspect, a computing device is provided, including a memory and a processor, where the memory stores executable code, and when the processor executes the executable code, the methods according to the first aspect to the third aspect are implemented.

According to the method and device provided in the implementations of the present specification, samples in the sample set are clustered offline at two levels in advance, and indexes are established at two levels. In the online query process, similar samples of the query sample are determined through retrieval and screening at two levels correspondingly. In the above process, the sample range is reduced through the first-level search, and in the second-level search, a large number of high-dimensional vector calculations are converted into low-dimensional segment vectors, thereby further increasing the operation speed. Thus, query and retrieval of complex samples are accelerated.

BRIEF DESCRIPTION OF THE SEVERAL VIEWS OF THE DRAWINGS

To describe the technical solutions in the implementations of the present disclosure more clearly, the following briefly introduces the accompanying drawings required for describing the implementations. Clearly, the accompanying drawings in the following description are merely some implementations of the present disclosure, and a person of ordinary skill in the field can still derive other drawings from these accompanying drawings without creative efforts.

DETAILED DESCRIPTION

The solutions provided in the present specification are described below with reference to the accompanying drawings.

Figure 1:
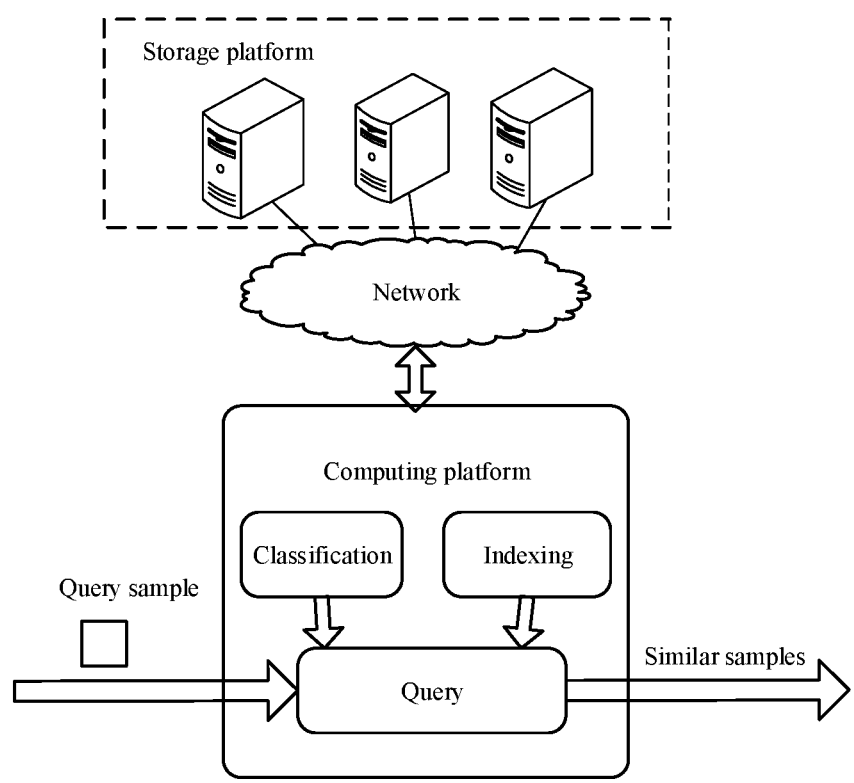
FIG. 1 is a schematic diagram illustrating an application scenario of some implementations disclosed in the present specification.

FIG. 1 is a schematic diagram illustrating an application scenario of some implementations disclosed in the present specification. As shown in FIG. 1, a storage platform stores a sample set including a large number of samples, where the samples can be various content types such as pictures, audio, documents, etc. The storage platform can be a centralized platform or a distributed platform, for example, Hadoop Distributed File System (HDFS). To cope with the user's searches and queries for these complex samples, the computing platform analyzes and processes the sample sets in the storage platform offline in advance. The offline processing of the computing platform mainly includes two parts: classification and indexing. During classification, the computing platform performs two-level clustering on the samples in the sample set. First-level clustering is to cluster feature vectors of each sample as a whole to obtain a coarse cluster center; and second-level clustering is to divide the feature vector of each sample into M segments, perform segment clustering for each segment i, and obtain a segment cluster center corresponding to each segment. The above coarse cluster center and each segment cluster center can be recorded separately in a vector table, which can further include a first vector table and a second vector table.

During indexing, the computing platform establishes an index for each sample in the sample set, so that each sample can be pointed to the coarse cluster center and the segmented cluster center obtained through classification based on the index, e.g., each sample in the sample set is added to or assigned to the cluster center to which the index is pointed. Corresponding to the two-level classification, two-level indexes are established for each sample, the first-level index points to the coarse cluster center to which the sample belongs, and the second level index points to the segment cluster center corresponding to the segment vector of the sample. Correspondingly, an index table is established for the sample set, and the index table includes a first index field and a second index field, where the first index field records a first-level index of each sample, and the second index field records a second level index of each sample.

After the classification and the indexing are performed, the computing platform can quickly process the online query request by using the results of the classification and the indexing. Specifically, the received query samples T are correspondingly queried at two levels. First-level query is to determine a coarse cluster center that is close to the query sample T from the first vector table obtained through the classification, and obtains samples belonging to the coarse cluster center by using the first index field of the index table, where such samples are referred to as comparison samples. Second-level query is to determine the distance between the query sample T and each of the comparison samples, and use the comparison samples whose distances meet the criterion as similar samples. More specifically, the distance between the query sample T and each comparison sample can be quickly determined based on the second vector table and the second index field. Thus, the query is accelerated through two stages of queries.

It can be understood that the computing platform shown in FIG. 1 can be any entity with processing and computing capabilities, for example, a server. Although in the above description the computing platform is shown as a centralized platform, in practice, the computing platform can also be implemented as a distributed platform. Alternatively, the computing platform can include different processing modules for processing at different stages. For example, a classification module is used for offline classification, an index module is used for indexing, and a query module is used for query. The following describes in detail execution modes of classification, indexing, and query.

Figure 2:
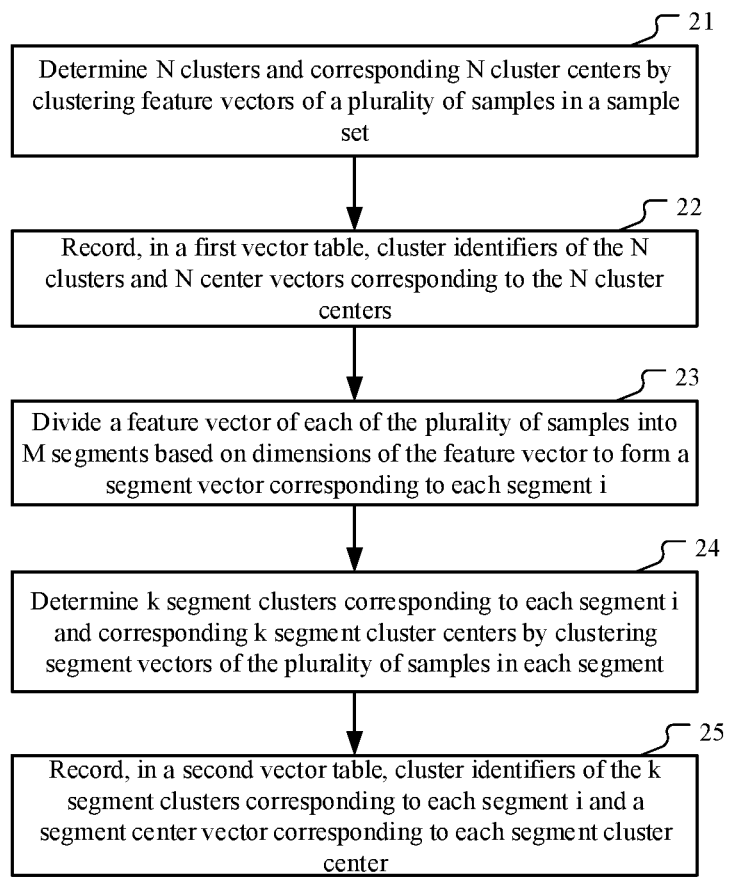
FIG. 2 is a flowchart illustrating classification according to some implementations.

FIG. 2 is a flowchart illustrating classification according to some implementations. As shown in FIG. 2, the classification can include the following steps: step S21: Determine N clusters and corresponding N cluster centers by clustering feature vectors of a plurality of samples in a sample set; step S22: Record, in a first vector table, cluster identifiers of the N clusters and N center vectors corresponding to the N cluster centers; step S23: Divide a feature vector of each of the plurality of samples into M segments based on dimensions of the feature vector to form a segment vector corresponding to each segment i; step S24: Determine k segment clusters corresponding to each segment i and corresponding k segment cluster centers by clustering segment vectors of the plurality of samples in each segment; and Step s25: Record, in a second vector table, cluster identifiers of the k segment clusters corresponding to each segment i and a segment center vector corresponding to each segment cluster center. The following describes execution of the above steps.

It can be understood that the sample set includes a large number of samples to be processed and retrieved, which can be stored in a distributed file system such as Hadoop Distributed File System (HDFS). To analyze these samples, in a preliminary step, a feature vector can be first extracted for each sample, where the feature vector is used to represent the features of the sample. As described above, the samples can be various content types such as pictures, audio, documents, etc. For different types of samples, their feature vectors can be extracted in a known way. For example, for a picture sample, sample features can include the following: the number of pixels, gray mean value, gray median value, the number of sub-regions, sub-region area, sub-region gray mean value, etc. For text samples, sample features can include: unitary, binary, and ternary words in text, the number of words, word frequency, etc. These features can be extracted as vector elements to constitute feature vectors of the text samples. For other types of samples, a corresponding way known in the art can be used. It can be understood that for complex types of samples, such as pictures, audio, etc., the feature vectors of the samples are typically high-dimensional vectors. Typically, the feature vectors of the picture samples can be in hundreds of dimensions, or even thousands of dimensions. Typically, the storage platform stores the samples and feature vectors of the samples.

Based on the extracted feature vectors, in step S21, the feature vectors of the plurality of samples in the sample set are clustered to determine N clusters and corresponding cluster centers. In some implementations, the number of samples in the sample set is not too large, for example, does not exceed a determined threshold, predetermined or dynamically determined, for example, 5000, and all of the samples in the sample set can be clustered. In another implementation, the number of samples in the sample set is very large, for example, exceeding the above threshold, and in this case, some samples can be randomly selected from the sample set for clustering. Correspondingly, the plurality of samples in this step are a portion of the samples in the sample set.

The plurality of feature vectors corresponding to the plurality of samples can be clustered by using a plurality of clustering methods. In some implementations, k-means clustering is used for clustering. Specifically, k samples are randomly selected as initial mean vectors, the distances from the samples to the mean vectors are calculated, and the samples are classified into the clusters that have smallest distances among the clusters. A new mean vector is then computed. Such actions are iterated until the mean vector cannot be further updated or until the maximum number of iterations has been reached. In another implementation, hierarchical clustering algorithms, such as a BIRCH algorithm, a CURE algorithm, etc., are used for clustering. In still another implementation, density-based clustering algorithms, such as a DBSCAN algorithm, an OPTICS algorithm, etc., is used. Other clustering methods can also be used for clustering.

Assuming that the feature vectors of the plurality of samples are clustered into N clusters, and each cluster has a corresponding cluster center, then, in step S21, the N cluster centers are determined. It can be understood that the center of each cluster can be represented by a vector that has the same number of dimensions as a feature vector, and such a vector is referred to as the center vector. Correspondingly, in step S22, the center vectors corresponding to the N cluster centers can be recorded in a vector table, which is referred to as a first vector table.

Compared with the segment vector cluster in the subsequent step, the clustering in step S21 is sometimes referred to as a coarse clustering or a full vector clustering, and the resulting clusters are referred to as coarse clusters. It can be understood that the clustering algorithm and the clustering parameters can be set or adjusted based on the number of samples and the required accuracy, so as to adjust the number N of the resulting coarse clusters.

In a specific example, assuming that there are 50,000 samples in the sample library, in step S21, 5000 of the samples are clustered, and the feature vector of each sample has 500 dimensions, resulting in 20 coarse clusters and corresponding center vectors. Table 1 shows an example of the corresponding first vector table.

TABLE 1

| Coarse cluster | Center vector |
| --- | --- |
| C1 | $\vec{C1}$ = (C1-1, C1-2, . . . C1-500) |
| C2 | $\vec{C2}$ = (C2-1, C2-2, . . . C2-500) |
| C3 | $\vec{C3}$ = (C3-1, C3-2, . . . C3-500) |
| . . . | . . . |
| C20 | $\vec{C20}$ = (C20-1, C20-2, . . . C20-500) |

In Table 1, the cluster identifier of the $i^{th}$ cluster is denoted by Ci, and the center vector of the $i^{th}$ cluster is denoted by $\vec{Ci}$.

In addition, in step S23, the feature vector of each of the plurality of samples is divided into M segments based on the dimensions, thereby forming a segment vector corresponding to each segment i. As described above, feature vectors corresponding to complex samples are usually high-dimensional vectors. To further classify them besides the coarse clustering, dimension reduction processing is first performed on each feature vector. Specifically, the feature vector of each sample is divided into M segments, thereby forming M segment vectors. In some implementations, the feature vector for each sample is equally divided into M segment vectors. Assuming that the dimension of the feature vector of the sample is P, it can be equally divided into M P/M-dimensional segment vectors. In another implementation, the segment vectors can be non-uniform, for example, the dimension of the $i^{th}$ segment is Pi, provided that the sum of Pi (i=1 to M) is the total number of dimensions P. More specifically, in an example, it is assumed that the feature vector of the sample has 500 dimensions, e.g., V=(f1, f2, f3, . . . , f500), and the feature vector is divided into 50 segments in step S22, e.g., M=50. When the feature is equally divided, each segment is a 10-dimensional segment vector, e.g., the first segment vector V1=(f1, f2, f3, . . . , F10), the second segment vector V2=(f11, f12, . . . , F20), the $i^{th}$ segment vector Vi=(f10i+1, f10i+2, f11i).

On this basis, in step S24, segment vectors of the plurality of samples in each segment are clustered to determine k segment clusters and segment cluster centers corresponding to each segment i; and in step S25, identifiers of the segment clusters and segment center vectors corresponding to the segment cluster centers are recorded in a second vector table.

It can be understood that because the feature vector of each sample is segmented, each sample has M segment vectors. The segment vectors of the samples in the same segment i can be clustered again to determine k segment cluster centers corresponding to the segment i. In some implementations, the same number of segment cluster centers are determined for each segment by using the same clustering algorithm. In another implementation, different numbers of segment cluster centers can be determined for different segments by using different clustering algorithms.

Still taking the 500-dimensional vector divided into 50 segments as an example, it is assumed that, in an example, the segment vectors of each segment are clustered using the same clustering algorithm to obtain 16 segment cluster centers (k=16) for each segment. Each segment cluster center can be represented as a vector having a same number of dimensions as the corresponding segment vectors, and such a vector is referred to as a segment center vector. In this example, each segment vector has 10 dimensions, and correspondingly, the segment center vector is a 10-dimensional vector. The determined segment center vector corresponding to each segment can be recorded in the second vector table. Table 2 shows the second vector table in this example.

It should be understood that Table 2 is only an example. If the segments are non-uniform, both the dimensions of the segment vectors corresponding to the segments and the dimensions of the segment center vectors can be different. If the segments are based on different clustering algorithm, or a same clustering algorithm with different algorithm parameters, the number of segment clusters obtained for each segment through clustering can be different.

Thus, the sample set is classified in the way shown in FIG. 2, and the first vector table and the second vector table are obtained as classification results. In some implementations, the first sector table and the second vector table are stored locally on the computing platform. In another implementation, the first sector table and the second vector table are stored in a distributed file system, such as an HDFS system. In this case, the computing platform needs to record the configuration parameters of the first vector table and the second vector table in the distributed file system, and the configuration parameters are used for recording the specific storage location and the access path of each vector table in the distributed file system.

In some implementations, the computing platform performs the classification shown in FIG. 2 at determined intervals, predetermined or dynamically determined, for example, once a day, once every three days, etc., to cope with changes and updates to samples in the sample set. In the process of performing the above classification for a plurality of times, samples of the same part in the sample set can be selected for clustering at a time, or samples of different parts can be selected for clustering at a time. In case of any change to the generated first vector table and second vector table, the stored first vector table and second vector table are updated.

Figure 3:
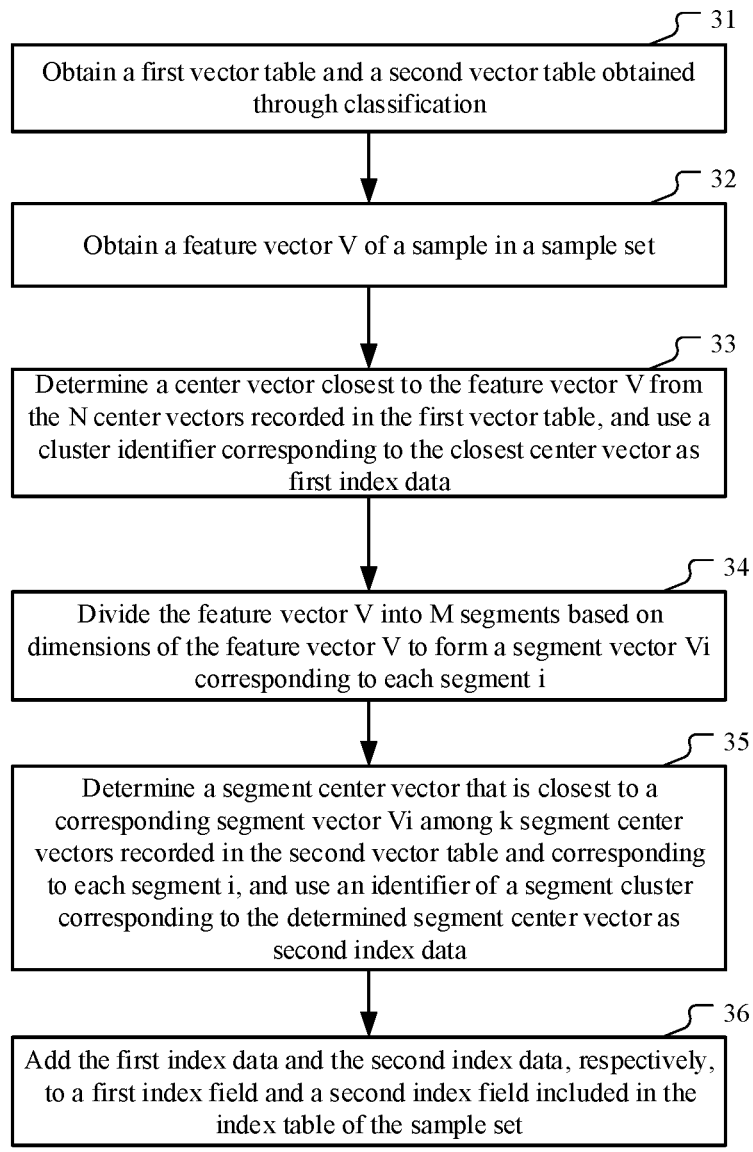
FIG. 3 is a flowchart illustrating indexing according to some implementations.

Based on the result of the classification, each sample in the sample set can be indexed, so that each sample can be pointed to, through the indexing, a coarse cluster center and a segmented cluster center that is obtained through classification. FIG. 3 is a flowchart illustrating indexing according to some implementations. As shown in FIG. 3, the indexing process includes the following steps: step S31: Obtain a first vector table and a second vector table obtained through the classification; step S32: Obtain a feature vector V of a sample in the sample set; step S33: Determine a center vector that is closest to the feature vector V among the N center vectors recorded in the first vector table, and use a cluster identifier corresponding to the closest center vector as first index data; step S34: Divide the feature vector V into

TABLE 2

|  | Segment cluster 1 | | Segment cluster 2 | | Segmented cluster j | | | Segment cluster 16 | |
| --- | --- | --- | --- | --- | --- | --- | --- | --- | --- |
|  | Cluster classifier | Segment center vector | Cluster classifier | Segment center vector | Cluster identifier | Segment center vector | . . . | Cluster classifier | Segment center vector |
| Segment 1 | S1-1 | $\vec{S}_{1\text{-}1}$ | S1-2 | $\vec{S}_{1\text{-}2}$ | S1-j | $\vec{S}_{1\text{-}j}$ | . . . | S1-16 | $\vec{S}_{1\text{-}16}$ |
| Segment 2 | S2-1 | $\vec{S}_{2\text{-}1}$ | S2-2 | $\vec{S}_{2\text{-}2}$ | S2-j | $\vec{S}_{2\text{-}j}$ | . . . | S2-16 | $\vec{S}_{2\text{-}16}$ |
| Segment i | Si-1 | $\vec{S}_{i\text{-}1}$ | Si-2 | $\vec{S}_{i\text{-}2}$ | Si-j | $\vec{S}_{i\text{-}j}$ | . . . | Si-16 | $\vec{S}_{i\text{-}16}$ |
| . . . | . . . |  | . . . |  | . . . |  |  | . . . |  |
| Segment 50 | S50-1 | $\vec{S}_{50\text{-}1}$ | S50-2 | $\vec{S}_{50\text{-}2}$ | S50-j | $\vec{S}_{50\text{-}j}$ | . . . | S50-16 | $\vec{S}_{50\text{-}16}$ |

In Table 2, Si-j represents the $j^{th}$ segment cluster in the $i^{th}$ segment, and $\vec{S}_{i\text{-}j}$ represents the segment center vector corresponding to Si-j; in the example in which a 500-dimensional vector is equally divided into 50 segments, each segment center vector $\vec{S}_{i\text{-}j}$ is a 10-dimensional vector.

M segments based on dimensions of the feature vector V to form a segment vector Vi corresponding to each segment i; step S35: Determine a segment center vector closest to a corresponding segment vector Vi among k segment center vectors corresponding to each segment i that are recorded in the second vector table, and use an identifier of a segment cluster corresponding to the determined segment center vector as second index data; and step S36: Add the first index data and the second index data, respectively, to a first index field and a second index field included in the index table of the sample set. The following describes execution of the above steps.

First, in step S31, the first vector table and the second vector table obtained through the classification are obtained. In some implementations, the first sector table and the second vector table are stored in a distributed file system. In this case, the configuration parameters of the first sector and the second vector table can be obtained first, the access paths of the first vector table and the second vector table can be obtained based on the configuration parameters, and the first vector table and the second vector table can be retrieved based on the access paths.

In some implementations, as described above, the first vector table and the second vector table are updated at determined intervals, predetermined or dynamically determined. In this case, it is first determined whether the first vector table and the second vector table are updated, and the next step is performed only when the first vector table and the second vector table are updated. In an example, the update status of the vector table is indicated by setting a tag file. For example, when the first vector table and the second vector table are updated, a specific file, for example, a done file, is generated, and the file is deleted or hidden during the reclassification. Correspondingly, the update status of the vector table is determined by querying the tag file. For example, it is determined whether the done file exists, to determine whether the vector tables are updated. In another example, the update status can also be set in another form, for example, by setting a status tag of the vector tables. When it is determined that the first vector table and the second vector table are updated, the following step S32 is performed.

In step S32, the feature vector V of a sample R in the sample set is obtained. It can be understood that the feature vector V of the arbitrary sample R is also a high-dimensional vector as described above. For the extraction process and possibly included elements, reference can be made to the above descriptions. Details are omitted for simplicity.

Next, in step S33, the center vector closest to the feature vector V is determined among the N center vectors recorded in the first vector table, and the cluster identifier corresponding to the closest center vector is used as the first index data.

As described above, the first vector table records the center vectors corresponding to the N cluster centers obtained through coarse clustering. In step S33, the distances between the feature vectors V and the N center vectors are calculated and the closest center vector is determined. The cluster identifier corresponding to the closest center vector, such as the cluster ID number, is used as the first index data. In other words, the center vector closest to the overall feature vector V of the sample R is determined, thereby determining the coarse cluster to which the feature vector V belongs. Therefore, the first index data indicates the coarse cluster to which the feature vector V belongs, e.g., the cluster closest to the feature vector V.

For example, Table 1 records 20 clusters obtained by clustering 5000 500-dimensional feature vectors, and center vectors $\vec{C1}$ to $\vec{C20}$ corresponding to the cluster centers. Assuming that the current sample R also has a 500-dimensional feature vector V, then the distance D1 to D20 between the feature vector V and $\vec{C1}$ to $\vec{C20}$ can be calculated, and then the center vector with the minimum distance can be determined. Assuming that it is determined in this step that $\vec{C9}$ is closest to the feature vector V in the center vectors, the first index data of the sample is the cluster identifier C9 corresponding to $\vec{C9}$. In other words, the sample belongs to the cluster C9 as a whole from the full vector.

In addition, in step S34, the feature vector V is divided into M segments based on dimensions of the feature vector V, to form a segment vector Vi corresponding to each segment. It can be understood that the way in which the high-dimensional feature vector V is divided into M segments in this step is consistent with the segmentation way of the segment clustering included in the classification. Details are omitted for simplicity.

Next, in step S35, the segment center vector closest to the corresponding segment vector Vi is determined among the k segment center vectors corresponding to each segment i that are recorded in the second vector table, and the identifier of the segment cluster corresponding to the determined closest segment center vector is used as the second index data.

As described above, the second vector table records k segment clusters corresponding to each segment i and a segment center vector corresponding to the center of each segment cluster, which are obtained through segment clustering. Correspondingly, in step S35, for each segment i, the distance between the segment vector Vi of the sample R and the k segment center vectors is calculated, the segment center vector closest to the k segment center vectors is determined, and the identifier of the segment cluster corresponding to the segment center vector, for example, the segment cluster ID number, is used as the second index data. In other words, the segment center vector closest to the segment vector Vi of the sample R in each segment i is determined, so as to determine the segment cluster to which the segment vector Vi belongs. The second index data indicates a segment cluster to which each segment vector Vi belongs, e.g., the cluster closest to each segment vector Vi.

For example, Table 2 records 16 segment clusters Si-j in each segment i that are obtained by dividing a 500-dimensional feature vector into 50 segments (M=50) and performs segment clustering on the segment vectors of each segment, and a segment center vector $\vec{S_{i\text{-}j}}$ corresponding to each segment cluster center. Assume that the feature vector V of the current sample R is also equally divided into 50 segments. For each segment i, the distance between the segment vector Vi of the sample R and the 16 segment center vectors in the segment i can be calculated to determine the closest segment center vector. For example, assume that it is determined in this step that, for the 16 segment center vectors $\vec{S_{1\text{-}1}}$ to $\vec{S_{1\text{-}16}}$ in the first segment, the segment vector V1 of the sample R is closest to $S_{1\text{-}3}$, then the identifier S1-3 of the segment cluster corresponding to the segment center vector can be included in the second index data. Similarly, it is assumed that after calculation and comparison, in the second segment, the segment center vector closest to the segment vector V2 of the sample R is $\vec{S_{2\text{-}11}}$, in the third segment, the segment center vector closest to the segment vector V3 is $\vec{S_{3\text{-}8}}$, . . . and in the 50$^{th}$ segment, the segment center vector closest to the segment vector V50 is $\vec{S_{50\text{-}5}}$. Thus, the nearest segment center vector in each segment and the corresponding segment cluster can be determined. Correspondingly, in this specific example, the second index data of the sample R can include a segment cluster S1-3 in the first segment, a segment cluster S2-11 in the second segment, a segment cluster S3-8 in the third segment, . . . , and a segment cluster S50-5 in the $50^{th}$ segment.

After the first index data and the second index data are determined, in step S36, the determined first index data and the second index data are added to the index table of the sample set. Specifically, when an index table is established for a sample set, a first index field and a second index field are set, where the first index field is used for storing first index data of each sample, and the second index field is used for storing second index data of each sample. Correspondingly, after an index is established for a sample, e.g., after the first index data and the second index data are determined, the first index data is added to the first index field corresponding to the sample in the index table, and the second index data is added to the second index field corresponding to the sample. For example, in the above example of the 500-dimensional sample R, the first index data is C9, and the second index data includes S1-3, S2-11, S3-8, etc. Correspondingly, C9 can be added to the first index field corresponding to the sample, and S1-3, S2-11, S3-8, etc., can be added to the second index field corresponding to the sample.

The above has described the process of establishing an index for a sample R in a sample set. It can be understood that by performing the above method on each sample in the sample set, an index can be established for each sample in the sample set. When a sample set changes, for example, a new sample is added, the method shown in FIG. 3 can be performed for the new sample to update the index table. As such, the index table can record index information of each sample in the sample set. Table 3 shows an example index table.

TABLE 3

| Sample ID | First index field | Second index field |
|---|---|---|
| Sample Y1 | C2 | S1-3, S2-1, S3-10, . . . S50-16 |
| Sample Y2 | C5 | S1-16, S2-13, S3-1, . . . , S50-5 |
| . . . | . . . | . . . |
| Sample R | C9 | S1-3, S2-11, S3-8, . . . , S50-5 |
| Sample Ym | Im | IIm-1, IIm-2, IIm-3, . . . , IIm-j, . . . , IIm-50 |

In Table 3, the data Im in the first index field of the sample Ym indicates the coarse cluster to which the sample m belongs, and the value of Im is selected from C1 to C20 in Table 1; IIm-j in the second index field indicates the segment cluster to which the $j^{th}$ segment of the sample m belongs, and its value is selected from Sj-1 and Sj-2 to Sj-16 in Table 2. In particular, the index information of the sample R is also shown in Table 3; that is, the data of the first index field is C9, and the data of the second index field includes S1-3, S2-11, S3-8, . . . , S50-5.

It can be understood that Table 3 only shows an example of the information included in the index table, and the specific storage structure of the index table can be set as required. In an example, the index table is divided into sub-tables, which are stored in a distributed file system.

In some implementations, after the index table is established, the index table is further processed to obtain an inverted index. Specifically, index inversion is performed based on the first index field in the index table to obtain a first inverted index table. Index inversion is an indexing method commonly used in the art, and is a process of inversely determining a data item based on an index value. Because the first index field in the index table obtained above records the coarse cluster identifier corresponding to each sample, the sample corresponding to each coarse cluster can be determined by performing index inversion based on the index of the first index field. The mappings from the coarse clusters to the corresponding samples are recorded in the first inverted index table. Therefore, the first inverted index table actually records samples belonging to each coarse cluster Ci. Table 4 shows an example of a first inverted index table.

TABLE 4

| Coarse cluster | Corresponding sample |
|---|---|
| C1 | Y1, Y21, Y23, Y61 . . . |
| C2 | Y3, Y8, Y9, Y34 . . . |
| C3 | Y2, Y5, Y11, Y24 . . . |
| . . . | . . . |
| C20 | Y4, Y10, Y13, Y52 . . . |

Corresponding to Table 1, Table 4 records samples corresponding to 20 coarse clusters. It can be understood that Table 3 and Table 4 are only examples, and the specific storage format of the index table can be set based on the service requirements. In some implementations, in addition to storing an index table shown in Table 3, an inverted index table shown in Table 4 is stored.

As described above, the process of classifying the sample set is described with reference to FIG. 2, and the process of establishing an index table for the sample set is described with reference to FIG. 3. It can be understood that the classification shown in FIG. 2 and the indexing shown in FIG. 3 are pre-processing performed on the sample set, and can be performed offline in advance to accelerate the processing and recall of the online query.

The process of online query of samples is described below.

Figure 4:
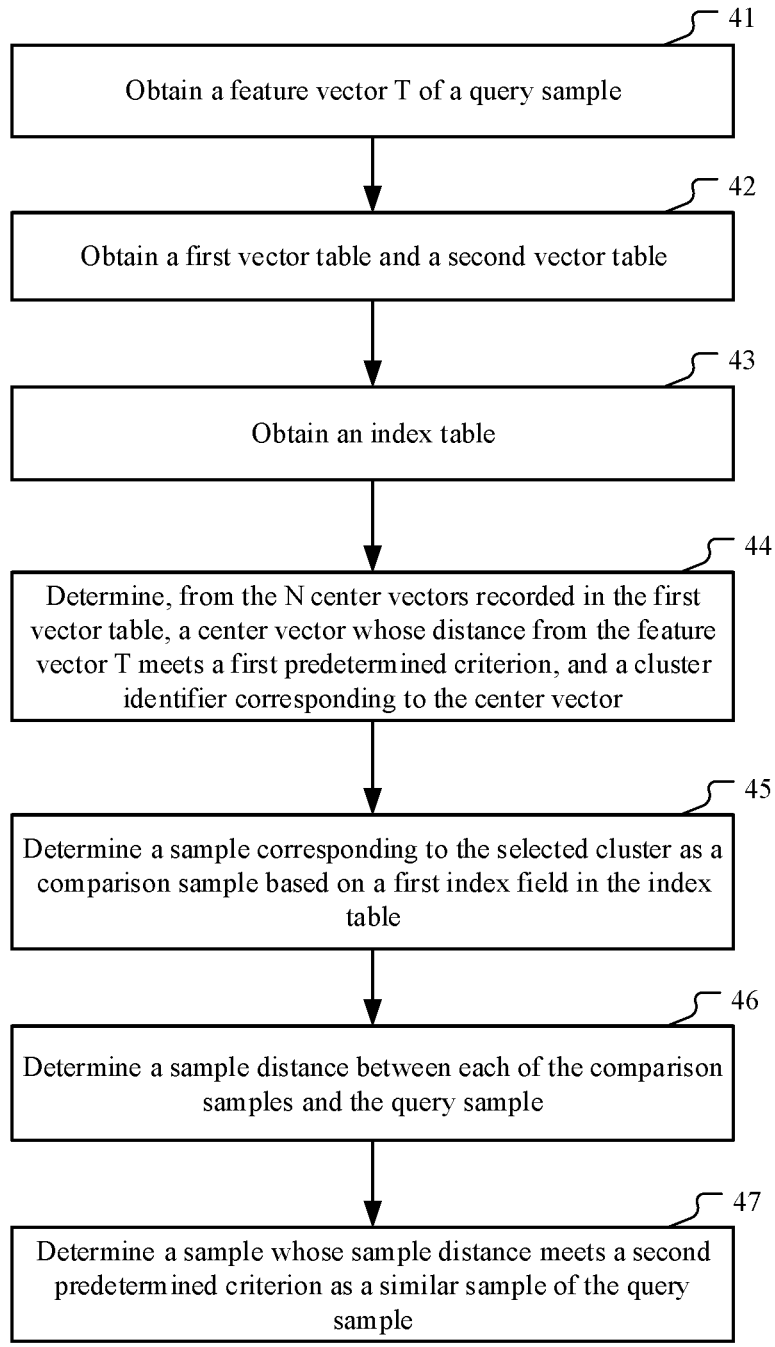
FIG. 4 is a flowchart illustrating a method for querying similar objects according to some implementations.

FIG. 4 is a flowchart illustrating a method for querying similar objects according to some implementations. As shown in FIG. 4, the method for querying a similar sample includes the following steps: step S41: Obtain a feature vector T of a query sample; step S42: Obtain the first vector table and the second vector table that are obtained using the method in FIG. 2; step S43: Obtain an index table that is obtained using the method in FIG. 3; step S44: Determine, among the N center vectors recorded in the first vector table, a center vector whose distance from the feature vector T meets a first determined criterion, predetermined or dynamically determined, and a cluster identifier corresponding to the center vector; step S45: Determine a sample corresponding to the selected cluster as a comparison sample based on the first index field in the index table; step S46: Determine a sample distance between each of the comparison samples and the query sample; and step S47: Determine a comparison sample whose sample distance meets a second determined criterion, predetermined or dynamically determined, as a similar sample of the query sample. The following describes execution of the above steps.

First, in step S41, the feature vector T of the query sample is obtained. Generally, a query sample is a sample entered by a user to obtain a sample similar to the query sample, for example, the user enters a picture to find other pictures similar to the picture. In some implementations, after the query request is received from a user, in step S41, a query sample, for example, a picture, entered by the user is obtained from the query request, and its feature vector T is extracted from the query sample. For the extraction process and possibly included elements, references can be made to the description of step S21 in FIG. 2. Details are omitted for simplicity.

In addition, in step S42 and step S43, the first vector table and the second vector table that are obtained using the method in FIG. 2 and the index table obtained using the method in FIG. 3 are respectively obtained. In some implementations, the first vector table, the second vector table, and the index table, are locally stored on the computing platform that is used to perform query processing. In this case, the vector tables and the index table can be directly accessed. In another implementation, the first vector table and/or the second vector table and/or the index table are stored in a distributed file system. In this case, in the above steps, the configuration parameters of the corresponding vector table and/or the index table are first obtained, the storage locations and the access paths are extracted therefrom, and the corresponding vector tables and/or the index tables are obtained based on the access paths.

Once the first vector table is obtained, step S44 can be performed to determine, among the N center vectors recorded in the first vector table, a center vector whose distance from the feature vector T meets the first determined criterion as the selected center vector, and to determine an identifier of the selected cluster corresponding to the selected center vector.

As described above, the first vector table records N center vectors corresponding to the N clusters obtained through coarse clustering. In step S44, the distances between the feature vector T of the query sample and the N center vectors can be calculated in sequence to obtain N distances, and the center vector meeting the determined criterion, predetermined or dynamically determined, can be determined as the selected center vector based on the N distances. For differentiation, the determined criterion here is referred to as a first determined criterion.

In some implementations, the first determined criterion is the closest center vector. In this case, the closest selected center vector can be determined in step S44.

In another implementation, the first determined criterion is a determined number (n) of center vectors with a minimum distance, for example, n=3. Correspondingly, in step S44, the calculated N distances are sorted, and the three center vectors with the minimum distance value are determined as the selected center vectors.

In still another implementation, the first determined criterion is a center vector whose distance is less than a determined threshold, predetermined or dynamically determined, for example, the threshold is D0. Correspondingly, in step S44, for the calculated N distances, a center vector whose distance is less than the threshold D0 is determined as the selected center vector.

In yet another implementation, the first determined criterion is a center vector of a determined proportion, predetermined or dynamically determined, of the N center vectors with the minimum distance. For example, assuming that the determined proportion is 10%, if N=20, two center vectors with the minimum distance are determined among the 20 center vectors as the selected center vectors; or if N=50, five center vectors with the minimum distance are determined among the 50 center vectors as the selected center vectors.

In another implementation, the first determined criterion can be set in another form based on traffic requirements. Once the selected center vector meeting the first determined criterion is determined, the selected cluster meeting the criterion and the corresponding cluster identifier can be determined based on the correspondences between the coarse cluster identifiers and the center vectors recorded in the first vector table.

In step S45, a sample corresponding to the selected cluster is determined as a comparison sample based on the first index field in the index table. As described above, the first index field of the index table records a coarse cluster corresponding to each sample. Samples corresponding to the selected cluster can be determined by querying the first index data in the first index field in the index table, and these samples can be used as comparison samples. This process is similar to the index inversion process. Therefore, in some implementations, step S45 includes: performing index inversion on the based on the first index field, to determine a sample corresponding to the selected cluster as the comparison sample. In another implementation, the above first inverted index table, for example, Table 4, has been established at the indexing stage. In this case, a sample corresponding to the selected cluster can be directly retrieved by querying the first inverted index table, and the sample can be used as a comparison sample.

It can be understood that in step S44 and step S45, a coarse cluster that is closer to the query sample, e.g., meeting the first determined criterion, is first determined, and then a comparison sample included in the coarse cluster is determined. In this way, the samples in the sample set are searched and screened at the first level, and the samples belonging to the same coarse cluster as the query samples or belonging to the nearby coarse cluster are selected as the comparison samples, and further comparison is performed at the next level.

For example, if 5000 samples are coarsely clustered into 20 clusters, each cluster includes 250 samples on average. Assuming that two coarse clusters are determined as the selected clusters in step S44, about 500 comparison samples will be determined in step S45. Thus, the sample range was reduced to 10% of the sample set through the first stage screening. The above screening greatly reduces calculation effort and performance consumption compared to the method in which the distance between the query sample and each sample in the sample set is directly calculated.

For the determined comparison samples, the comparison continues in the next step. Specifically, in step S46, the sample distance between each of the comparison samples and the query samples is determined.

In some implementations, the distance between the query sample and each comparison sample is directly calculated. In an example, the Euclidean distance between the feature vector of the query sample and the feature vector of the comparison sample is calculated as the sample distance. In another example, the cosine similarity between the feature vector of the query sample and the feature vector of the comparison sample is calculated as the sample distance. Other distance calculation methods known in the art can also be used.

In some implementations, to reduce the calculation amount and accelerate the calculation, the segment center vector in the second index data corresponding to the comparison sample is approximated as its segment vector, the segment distance $D_i$ between the query sample and the comparison sample in each segment i is calculated, and the sample distance $D_i$ is determined based on each segment distance $D_i$.

Figures 5, 6:
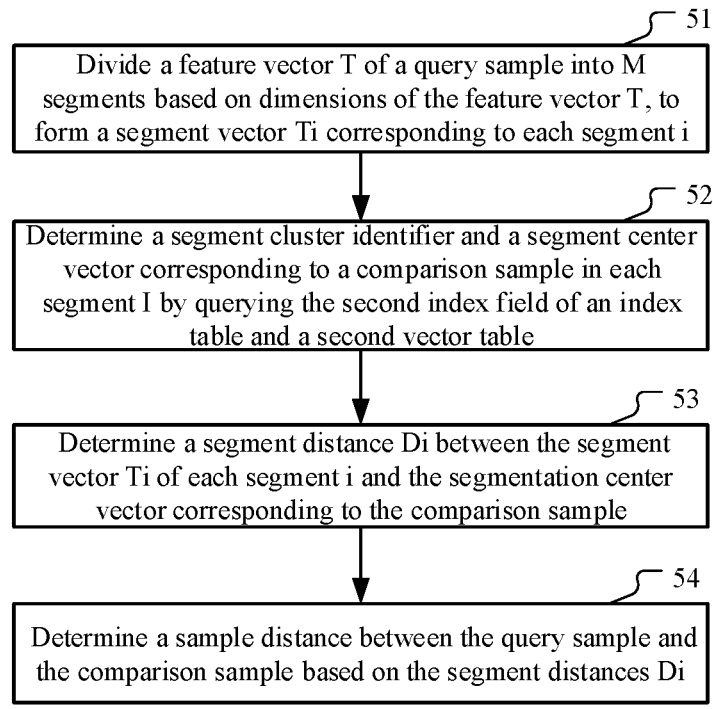
FIG. 5 is a flowchart illustrating determining a sample distance according to some implementations.
FIG. 6 is a schematic diagram illustrating querying a distance table.

FIG. 5 is a flowchart illustrating determining a sample distance according to some implementations, e.g., substeps of step S46 in FIG. 4. As shown in FIG. 5, first, in step S51, the feature vector T of the query sample is divided into M segments based on dimensions of the feature vector T, to form a segment vector Ti corresponding to each segment. It can be understood that the method for segmenting the feature vector T of the query sample is consistent with the vector segmentation method used in the sample classification and indexing processes.

Next, in step S52, the segment cluster identifier and the segment center vector corresponding to the comparison sample in each segment i are determined by querying the second index field of the index table and the second vector table. As described above, the data in the second index field indicates the segment cluster to which each segment vector of the sample belongs. The second vector table records the segment center vector corresponding to each segment cluster. The segment cluster to which the comparison sample belongs in each segment i and the corresponding segment center vector can be determined by querying the second vector table and the second index field of the index table. Here, the segment center vector of the segment cluster to which the comparison sample belongs in the segment i is approximated as the segment vector of the comparison sample in the segment i. Thus, each segment vector of the comparison sample is approximately obtained through table lookup, and the process of re-dividing the comparison sample into a plurality of segment vectors is omitted, so that calculation is simplified and speed is improved.

As described above, in step S51, the segment vector Ti of the feature vector T in the segment i is obtained; and in step S52, the segment center vector of the comparison sample in segment i is determined. Based on this, in step S53, the segment distance Di between the segment vector Ti of each segment i and the segmentation center vector corresponding to the comparison sample can be determined. In this step, the distance between the two can be determined as the segment distance Di through conventional distance calculation.

Then, in step S54, the sample distance between the query sample and the comparison sample can be determined based on the segment distances Di.

In some implementations, the segment distances Di are summed, and the summation result is used as the sample distance D of the query sample and the comparison sample.

$$D = \sum_{i=1}^{M} Di$$

In some implementations, the square sum of the segment distances Di is re-squared as the sample distance D of the query sample and the comparison sample.

$$D = \sum_{i=1}^{M} \sqrt{Di^2}$$

In another implementation, other algorithms can be used to determine the sample distance based on the segment distances Di. It can be understood that, in the above way, the calculation of the distance between the query sample and the comparison sample is converted from the operation between the high-dimensional vectors to the operation between the low-dimensional segment vectors, thereby accelerating the calculation.

Further, in some implementations, the calculation process for determining the segment distance Di in step S53 can be further accelerated by establishing and looking up in a distance table. Specifically, in some implementations, step S53 can include the following steps.

First, the distance Dij between the segment vector Ti of the query sample in each segment i and each segment center vector j of the segment i recorded in the second vector table is calculated to form a distance table.

Next, the distance table is queried by using the segment cluster identifier that corresponds to the comparison sample in the segment i that is determined in step S52, to determine the segment distance Di between the segment vector Ti and the segment center vector corresponding to the comparison sample.

FIG. 6 shows the above table lookup process. In the schematic diagram shown in FIG. 6, it is assumed that a distance table is established based on the second vector table shown in Table 2. Specifically, Table 2 shows the case where a sample in a sample set is divided into 50 segments, and each segment has 16 segment cluster centers. For each segment, e.g., i=1 to 50, the distance between the segment vector Ti of the query sample and the 16 segment center vectors in the segment can be calculated, to form a 50*16 distance table. The distance Dij in the distance table indicates the distance between the segment vector Ti and the segment center vector of the $j^{th}$ segment cluster in the segment i.

In addition, it is assumed that the segment cluster of the comparison sample in each segment is determined by querying the second index field. For example, the second index data of the comparison sample Y1 includes S1-3, S2-1, . . . , S50-16, which means that Y1 belongs to the third segment cluster S1-3 in segment 1, belongs to the first segment cluster S2-1 in the segment 2, . . . , and belongs to the $16^{th}$ segment cluster in the segment 50. Therefore, by locating the second index data in the distance table, the distance between the segment vectors T1 and S1-3 in the segment 1, e.g., D1-3, can be used as the segment distance D1, and the distance between the segment vectors T2 and S2-1 in the segment 2, e.g., D2-1, can be used as the segment distance D2, . . . , and the distance between the segment vector T50 and S50-16 in the segment 50, e.g., D50-16, used as the segment distance D50. In FIG. 6, the segment distance between the comparison sample Y1 and each segment of the query sample that is determined through table lookup is shown in a bold box.

It can be understood that when the number of comparison samples is still relatively large, for example, greater than a determined threshold, predetermined or dynamically determined, for example, 500, the calculation can be further accelerated by establishing and looking up in the distance table. Although a certain amount of calculation is required to establish the distance table, when the number of comparison samples is large, each segment distance in the distance table can be reused in the calculation of each comparison sample in sequence, and some repeated calculations are omitted, so that calculation efficiency can be further increased.

In the above way, each segment distance Di between the query sample and the comparison sample is obtained, and the total sample distance is determined based on the segment distances. It can be understood that such calculations can be performed for each comparison sample to obtain sample distance of each comparison sample.

Referring back to step S47 in FIG. 4, a sample whose sample distance meets the second determined criterion, predetermined or dynamically determined, is determined as a similar sample of the query sample based on the sample distance of each of the above comparison samples.

In some implementations, the second determined criterion is a comparison sample with the minimum sample distance. In this case, in step S47, the comparison sample with the smallest sample distance can be determined as the similar sample.

In another implementation, the second determined criterion is a determined number of comparison samples, for example, 10, with the minimum sample distance. Correspondingly, in step S47, the calculated sample distances are sorted, and 10 comparison samples with the minimum distance are determined as similar samples.

In still another implementation, the second determined criterion is a comparison sample whose sample distance is less than a distance threshold. Correspondingly, in step S47, for the calculated sample distance, a comparison sample whose sample distance is less than the threshold is determined as a similar sample.

In another implementation, the second determined criterion described above can be set based on the service requirements.

As such, similar samples of the query sample are determined through retrieval and screening at two levels. In the above process, the first determined criterion is used as a criterion for screening at the first level, which greatly reduces a sample range and reduces a data calculation amount. In the process of screening at the second level, the high-dimensional vector calculation can be converted into a segmented low-dimensional vector based on a pre-established vector table and an index table, and the calculation can be further accelerated. Thus, query and retrieval of complex samples are accelerated.

According to another implementation, devices for classifying, indexing, and querying a sample set are further provided.

Figure 7:
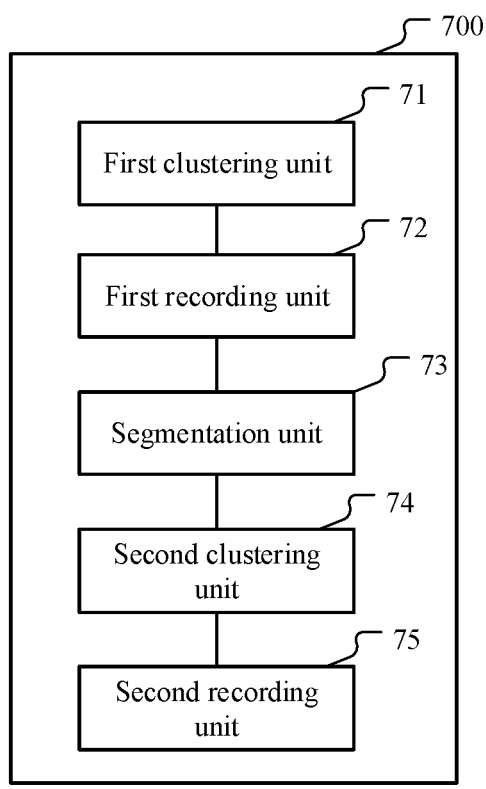
FIG. 7 is a schematic block diagram illustrating a sample set classification device according to some implementations.

FIG. 7 is a schematic block diagram illustrating a sample set classification device according to some implementations. As shown in FIG. 7, the classification device 700 includes a first clustering unit 71, configured to determine N clusters and corresponding N cluster centers by clustering feature vectors of a plurality of samples in a sample set; a first recording unit 72, configured to record, in a first vector table, cluster identifiers of the N clusters and N center vectors corresponding to the N cluster centers; a segmentation unit 73, configured to divide a feature vector of each of the plurality of samples into M segments based on dimensions of the feature vector to form a segment vector corresponding to each segment i; a second clustering unit 74, configured to determine k segment clusters corresponding to each segment i and corresponding k segment cluster centers by clustering segment vectors of the plurality of samples in each segment, respectively; and a second recording unit 75, configured to record, in a second vector table, cluster identifiers of the k segment clusters corresponding to each segment i and a segment center vector corresponding to each segment cluster center.

In some implementations, the device 700 further includes a recording unit (not shown), configured to store the first vector table and the second vector table in a distributed file system, and record configuration parameters corresponding to the first vector table and the second vector table, where the configuration parameters indicate access paths of the first vector table and the second vector table in the distributed file system.

Figure 8:
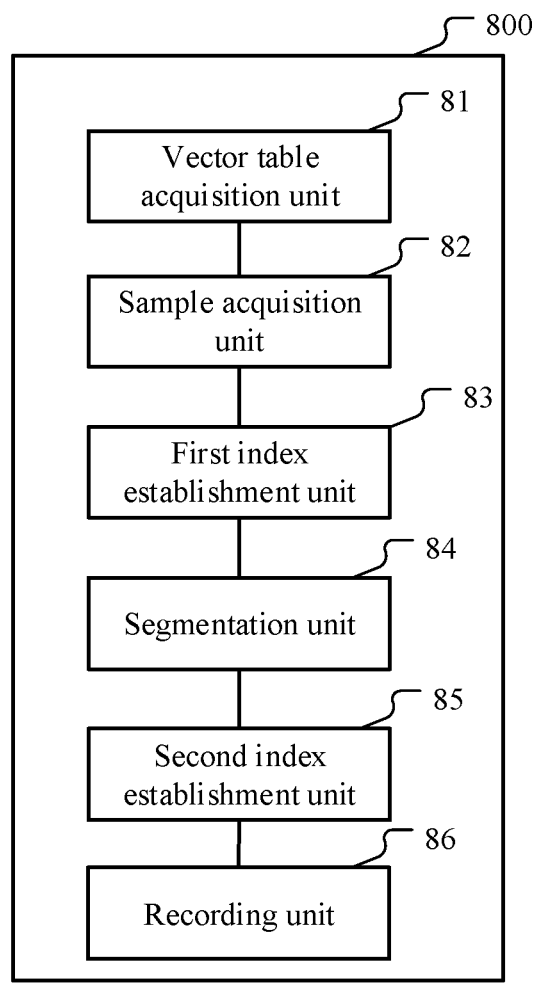
FIG. 8 is a schematic block diagram illustrating a device for establishing an index table for a sample set according to some implementations.

FIG. 8 is a schematic block diagram illustrating a device for establishing an index table for a sample set according to some implementations. As shown in FIG. 8, the device 800 includes: a vector table acquisition unit 81, configured to obtain the first vector table and the second vector table that are obtained by the device shown in FIG. 7; a sample acquisition unit 82, configured to obtain a feature vector V of a sample in the sample set; a first index establishment unit 83, configured to determine a center vector that is closest to the feature vector V among the N center vectors recorded in the first vector table, and use a cluster identifier corresponding to the closest center vector as first index data; a segmentation unit 84, configured to divide the feature vector V into M segments based on dimensions of the feature vector V to form a segment vector Vi corresponding to each segment i; a second index establishment unit 85, configured to determine a segment center vector closest to a corresponding segment vector Vi among k segment center vectors corresponding to each segment i that are recorded in the second vector table, and use a cluster identifier of a segment cluster corresponding to the determined segment center vector as second index data; and a recording unit 86, configured to add the first index data and the second index data, respectively, to a first index field and a second index field of an index table.

In some implementations, the first vector table and the second vector table are stored in a distributed file system, and correspondingly, the vector table acquisition unit 81 is configured to obtain configuration parameters of the first vector table and the second vector table, and obtain access paths of the first vector table and the second vector table based on the configuration parameters; and access the first vector table and the second vector table from the distributed file system based on the access paths.

In some implementations, the device 800 further includes a status query unit (not shown) configured to determine update statuses of the first vector table and the second vector table by querying a tag file.

In some implementations, the device 800 further includes an index inverting unit (not shown) configured to perform index inversion based on the first index field in the index table, to obtain a first inverted index table, where the first inverted index table records a sample corresponding to each cluster.

Figure 9:
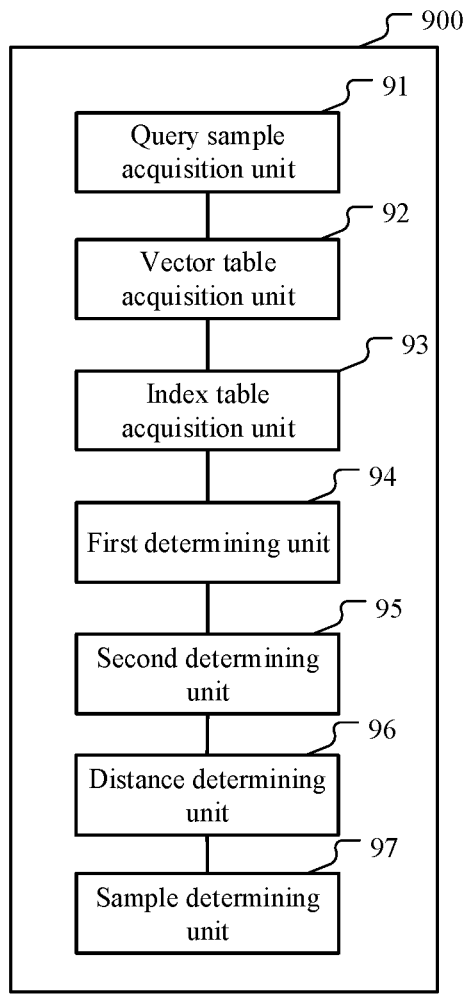
FIG. 9 is a schematic block diagram illustrating a device for querying similar objects according to some implementations.

FIG. 9 is a schematic block diagram illustrating a device for querying similar objects according to some implementations. As shown in FIG. 9, the device 900 includes: a query sample acquisition unit 91, configured to obtain a feature vector T of a query sample; a vector table acquisition unit 92, configured to obtain the first vector table and the second vector table that are obtained by the device 700 shown in FIG. 7; an index table acquisition unit 93, configured to obtain an index table obtained by the device shown in FIG. 8; a first determining unit 94, configured to determine, among the N center vectors recorded in the first vector table, a center vector whose distance from the feature vector T meets a first predetermined or dynamically determined criterion, and use a cluster corresponding to the center vector as a selected cluster; a second determining unit 95, configured to determine a sample corresponding to the selected cluster as a comparison sample based on the first index field in the index table; a distance determining unit 96, configured to determine a sample distance between each of the comparison samples and the query sample; and a sample determining unit 97, configured to determine a comparison sample whose sample distance meets a second predetermined or dynamically determined criterion as a similar sample of the query sample.

In some implementations, the first determined criterion is a determined number of center vectors with a smaller distance, or a center vector with a distance less than a determined threshold.

In some implementations, the second determining unit 95 is configured to determine a sample corresponding to the selected cluster as a comparison sample by performing index inversion based on the first index field.

In another implementation, the index table further includes a first inverted index table determined from the first index field, the first inverted index table recording a sample corresponding to each cluster; and correspondingly, the second determining unit 95 is configured to retrieve the sample corresponding to the selected cluster as the comparison sample by querying the first inverted index table.

In some implementations, the distance determining unit 96 is configured to: divide the feature vector T into M segments based on dimensions of the feature vector T, to form a segment vector Ti corresponding to each segment i; determine, by querying the second index field of the index table and the second vector table, a segment cluster identifier and the segment center vector corresponding to the comparison sample in each segment i; determine the segment distance Di between the segment vector Ti of the feature vector T in each segment i and the segment center vector corresponding to the comparison sample; and determine, based on each segment distance Di, the sample distance between the query sample and the comparison sample.

In some implementations, the distance determining unit 96 is further configured to calculate the distance Dij between the segment vector Ti in each segment i of the feature vector T and the respective segment center vector j in the segment i that is recorded in the second vector table, to form a distance table; and query the distance table using the segment cluster identifier corresponding to each segment i of the comparison sample, to determine the segment distance Di between the segment vector Ti and the segment center vector corresponding to the comparison sample.

By using the classification apparatus 700 and the indexing apparatus 800, the samples in the sample set are clustered offline at two levels in advance, and indexes are established at two levels. In the online query process, the query apparatus 900 determines similar samples of the query samples through retrieval and screening at two levels. In the above process, the sample range is reduced through the first-level search, and in the second-level search, a large number of high-dimensional vector calculations are converted into low-dimensional segment vectors, thereby further increasing the operation speed. Thus, query and retrieval of complex samples are accelerated.

According to another implementation, a computer readable storage medium is also provided, where the computer readable storage medium stores a computer program, and when the computer program is executed in a computer, the computer is enabled to perform the methods described with reference to FIG. 2 to FIG. 5.

According to still another implementation, a computing device is further provided, including a memory and a processor, where the memory stores executable code, and when the processor executes the executable code, the methods described with reference to FIG. 2 to FIG. 5 are implemented.

A person skilled in the art should be aware that, in one or more of the above examples, the functions described in the present specification can be implemented by using hardware, software, firmware, or any combination thereof. When these functions are implemented by software, they can be stored in a computer readable medium or transmitted as one or more instructions or code lines on the computer readable medium.

The specific implementations mentioned above further describe the object, technical solutions and beneficial effects of the present disclosure. It should be understood that the above descriptions are merely specific implementations of the present disclosure and are not intended to limit the protection scope of the present disclosure. Any modification, equivalent replacement and improvement made based on the technical solution of the present disclosure shall fall within the protection scope of the present disclosure.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sample set classification method, comprising:
   determining N clusters and corresponding N cluster centers by clustering feature vectors of a plurality of samples in a sample set;
   recording, in a first vector table, cluster identifiers of the N clusters and N center vectors corresponding to the N cluster centers;
   dividing a feature vector of each of the plurality of samples into M segments based on dimensions of the feature vector to form a segment vector corresponding to each segment i;
   determining k segment clusters corresponding to each segment i and corresponding k segment cluster centers by clustering segment vectors of the plurality of samples in each segment, respectively;
   recording, in a second vector table, cluster identifiers of the k segment clusters corresponding to each segment i and a segment center vector corresponding to each segment cluster center;
   obtaining a feature vector V of a sample in the sample set;
   determining a center vector that is closest to the feature vector V among the N center vectors recorded in the first vector table as a closest center vector, and using a cluster identifier corresponding to the determined closest center vector as first index data;
   dividing the feature vector V into M segments based on dimensions of the feature vector V to form a segment vector Vi corresponding to each segment i;
   determining a segment center vector closest to a corresponding segment vector Vi among the k segment center vectors corresponding to each segment i that are recorded in the second vector table as a closest segment center vector of the segment, and using a cluster identifier corresponding to the determined closest segment center vector as second index data; and
   adding the first index data and the second index data, respectively, to a first index field and a second index field of an index table.

2. The method according to claim 1, comprising:
   storing the first vector table and the second vector table in a distributed file system; and recording configuration parameters corresponding to the first vector table and the second vector table, wherein the configuration parameters indicate access paths of the first vector table and the second vector table in the distributed file system.

3. The method according to claim 1, wherein the first vector table and the second vector table are stored in a distributed file system; and the obtaining the first vector table and the second vector table comprises:

obtaining configuration parameters of the first vector table and the second vector table, and obtaining access paths of the first vector table and the second vector table based on the configuration parameters; and accessing the first vector table and the second vector table from the distributed file system based on the access paths.

4. The method according to claim 1, comprising determining update statuses of the first vector table and the second vector table by querying a tag file.

5. The method according to claim 1, comprising performing index inversion based on the first index field in the index table, to obtain a first inverted index table, wherein the first inverted index table records a sample corresponding to each cluster.

6. The method of claim 1, comprising:

obtaining a feature vector T of a query sample;

obtaining the first vector table and the second vector table;

obtaining the index table;

determining, among the N center vectors recorded in the first vector table, a center vector whose distance from the feature vector T meets a first predetermined criterion, and using a cluster corresponding to the center vector as a selected cluster;

determining a sample corresponding to the selected cluster as a comparison sample based on the first index field in the index table;

determining a sample distance between each of the comparison sample and the query sample; and determining a comparison sample whose sample distance meets a second predetermined criterion as a similar sample of the query sample.

7. The method according to claim 6, wherein the first predetermined criterion is a predetermined number of center vectors with a smaller distance, or a center vector with a distance less than a predetermined threshold.

8. The method according to claim 6, wherein the determining the sample corresponding to the selected cluster as a comparison sample based on the first index field in the index table comprises performing index inversion on the first index field to determine the sample corresponding to the selected cluster as the comparison sample.

9. The method according to claim 6, wherein:

the index table further comprises a first inverted index table determined from the first index field, and the first inverted index table recording a sample corresponding to each cluster; and the determining the sample corresponding to the selected cluster as the comparison sample based on the first index field in the index table comprises retrieving the sample corresponding to the selected cluster as the comparison sample by querying the first inverted index table.

10. The method according to claim 6, wherein the determining the sample distance between each of the comparison samples and the query sample comprises:

dividing the feature vector T into M segments based on dimensions of the feature vector T to form a segment vector Ti corresponding to each segment i;

determining, by querying the second index field of the index table and the second vector table, a segment cluster identifier and the segment center vector corresponding to the comparison sample in each segment i;

determining a segment distance Di between the segment vector Ti of the feature vector T in each segment i and the segment center vector corresponding to the comparison sample; and determining, based on each segment distance Di, the sample distance between the query sample and the comparison sample.

11. The method according to claim 10, wherein the determining the segment distance Di between the segment vector Ti of the feature vector T in each segment i and the segment center vector corresponding to the comparison sample comprises:

calculating a distance Dij between the segment vector Ti in each segment i of the feature vector T and a respective segment center vector j in the segment i that is recorded in the second vector table to form a distance table; and querying the distance table using the segment cluster identifier corresponding to each segment i of the comparison sample to determine the segment distance Di between the segment vector Ti and the segment center vector corresponding to the comparison sample.

12. A sample set classification device, comprising:

a first clustering unit, configured to determine N clusters and corresponding N cluster centers by clustering feature vectors of a plurality of samples in a sample set, and record, in a first vector table, cluster identifiers of the N clusters and N center vectors corresponding to the N cluster centers;

a segmentation unit, configured to divide a feature vector of each of the plurality of samples into M segments based on dimensions of the feature vector to form a segment vector corresponding to each segment i;

a second clustering unit, configured to determine k segment clusters corresponding to each segment i and corresponding k segment cluster centers by clustering segment vectors of the plurality of samples in each segment, respectively, and record, in a second vector table, cluster identifiers of the k segment clusters corresponding to each segment i and a segment center vector corresponding to each segment cluster center;

a vector table acquisition unit, configured to obtain the first vector table and the second vector table;

a sample acquisition unit, configured to obtain a feature vector V of a sample in the sample set, wherein the segmentation unit is configured to divide the feature vector V into M segments based on dimensions of the feature vector V to form a segment vector Vi corresponding to each segment i;

a first index establishment unit, configured to determine a center vector that is closest to the feature vector V among the N center vectors recorded in the first vector table as a closest center vector, and use a cluster identifier corresponding to the determined closest center vector as first index data;

a second index establishment unit, configured to determine a segment center vector closest to a corresponding segment vector Vi among k segment center vectors corresponding to each segment i that is recorded in the second vector table as a closest segment center vector of the segment, and use a cluster identifier corresponding to the determined closest segment center vector as second index data; and a recording unit, configured to add the first index data and the second index data, respectively, to a first index field and a second index field of an index table.

13. The device according to claim 12, comprising: a recording unit, configured to store the first vector table and the second vector table in a distributed file system, and record configuration parameters corresponding to the first vector table and the second vector table, wherein the configuration parameters indicate access paths of the first vector table and the second vector table in the distributed file system.

14. The device according to claim 12, wherein the first vector table and the second vector table are stored in a distributed file system; and the vector table acquisition unit is configured to:

obtain configuration parameters of the first vector table and the second vector table, and obtain access paths of the first vector table and the second vector table based on the configuration parameters; and access the first vector table and the second vector table from the distributed file system based on the access paths.

15. The device according to claim 12, comprising a status query unit, configured to determine update statuses of the first vector table and the second vector table by querying a tag file.

16. The device according to claim 12, comprising an index inverting unit, configured to perform index inversion based on the first index field in the index table, to obtain a first inverted index table, wherein the first inverted index table records a sample corresponding to each cluster.

17. The device of claim 12, comprising:

a query sample acquisition unit, configured to obtain a feature vector T of a query sample;

a vector table acquisition unit, configured to obtain the first vector table and the second vector table;

an index table acquisition unit, configured to obtain the index table;

a first determining unit, configured to determine, among the N center vectors recorded in the first vector table, a center vector whose distance from the feature vector T meets a first predetermined criterion, and use a cluster corresponding to the center vector as a selected cluster;

a second determining unit, configured to determine a sample corresponding to the selected cluster as a comparison sample based on the first index field in the index table;

a distance determining unit, configured to determine a sample distance between each of the comparison samples and the query sample; and a sample determining unit, configured to determine a comparison sample whose sample distance meets a second predetermined criterion as a similar sample of the query sample.

18. The device according to claim 17, wherein the first predetermined criterion is a predetermined number of center vectors with a smaller distance, or a center vector with a distance less than a predetermined threshold.

19. The device according to claim 17, wherein the second determining unit is configured to retrieve the sample corresponding to the selected cluster as the comparison sample by querying the first inverted index table.

20. The device according to claim 17, wherein:

the index table further comprises a first inverted index table determined from the first index field, and the first inverted index table recording a sample corresponding to each cluster; and the second determining unit is configured to retrieve the sample corresponding to the selected cluster as the comparison sample by querying the first inverted index table.

21. The device according to claim 17, wherein the distance determining unit is configured to:

divide the feature vector T into M segments based on dimensions of the feature vector T, to form a segment vector Ti corresponding to each segment i;

determine, by querying the second index field of the index table and the second vector table, a segment cluster identifier and the segment center vector corresponding to the comparison sample in each segment i;

determine the segment distance Di between the segment vector Ti of the feature vector T in each segment i and the segment center vector corresponding to the comparison sample; and determine, based on each segment distance Di, the sample distance between the query sample and the comparison sample.

22. The device according to claim 21, wherein the distance determining unit is configured to:

calculate the distance Dij between the segment vector Ti in each segment i of the feature vector T and the respective segment center vector j in the segment i that is recorded in the second vector table, to form a distance table; and query the distance table using the segment cluster identifier corresponding to each segment i of the comparison sample, to determine the segment distance Di between the segment vector Ti and the segment center vector corresponding to the comparison sample.

23. A computing device, comprising a memory and a processor, wherein the memory stores executable code, and when the processor executes the executable code, the processor implements acts including:

determining N clusters and corresponding N cluster centers by clustering feature vectors of a plurality of samples in a sample set;

recording, in a first vector table, cluster identifiers of the N clusters and N center vectors corresponding to the N cluster centers;

dividing a feature vector of each of the plurality of samples into M segments based on dimensions of the feature vector to form a segment vector corresponding to each segment i;

determining k segment clusters corresponding to each segment i and corresponding k segment cluster centers by clustering segment vectors of the plurality of samples in each segment, respectively;

recording, in a second vector table, cluster identifiers of the k segment clusters corresponding to each segment i and a segment center vector corresponding to each segment cluster center;

obtaining a feature vector V of a sample in the sample set;

determining a center vector that is closest to the feature vector V among the N center vectors recorded in the first vector table as a closest center vector, and using a cluster identifier corresponding to the determined closest center vector as first index data;

dividing the feature vector V into M segments based on dimensions of the feature vector V to form a segment vector Vi corresponding to each segment i;

determining a segment center vector closest to a corresponding segment vector Vi among the k segment center vectors corresponding to each segment i that is recorded in the second vector table as a closest segment center vector of the segment, and using a cluster identifier corresponding to the determined closest segment center vector as second index data; and adding the first index data and the second index data, respectively, to a first index field and a second index field of an index table.

24. The computing device of claim 23, wherein the acts include:

obtaining a feature vector T of a query sample;

obtaining the first vector table and the second vector table;

obtaining the index table;

determining, among the N center vectors recorded in the first vector table, a center vector whose distance from the feature vector T meets a first predetermined criterion, and using a cluster corresponding to the center vector as a selected cluster;

determining a sample corresponding to the selected cluster as a comparison sample based on the first index field in the index table;

determining a sample distance between each of the comparison sample and the query sample; and determining a comparison sample whose sample distance meets a second predetermined criterion as a similar sample of the query sample.

\* \* \* \* \*